United States Patent [19]

Mallener et al.

[11] Patent Number: 4,681,732
[45] Date of Patent: Jul. 21, 1987

[54] METHOD OF AND DEVICE FOR THE REDUCTION OF REACTIVITY OF A NUCLEAR REACTOR CORE

[75] Inventors: Werner Mallener, Düsseldorf; Theodor Overhoff, Niederzier, both of Fed. Rep. of Germany

[73] Assignee: Kernforschungsanlage Julich GmbH, Julich, Fed. Rep. of Germany

[21] Appl. No.: 656,989

[22] Filed: Oct. 3, 1984

[30] Foreign Application Priority Data

Oct. 3, 1983 [DE] Fed. Rep. of Germany ....... 3335839

[51] Int. Cl.⁴ .............................................. G21C 7/06
[52] U.S. Cl. .................................. 376/337; 376/329; 376/333; 376/336; 376/411; 376/419
[58] Field of Search ................... 376/327–329, 376/336–338, 419, 411, 333

[56] References Cited

U.S. PATENT DOCUMENTS

| | | | |
|---|---|---|---|
| 3,398,051 | 8/1968 | Seltorp | 376/338 |
| 3,427,222 | 2/1969 | Biancheria et al. | 376/419 |
| 3,565,762 | 2/1971 | Nickel | 376/338 |
| 3,663,218 | 5/1972 | Yario | 376/419 |
| 4,025,388 | 5/1977 | Jackson | 376/338 |
| 4,092,217 | 5/1978 | Schweiger et al. | 376/411 |
| 4,279,697 | 7/1981 | Overhoff et al. | 376/336 |

FOREIGN PATENT DOCUMENTS

| | | | |
|---|---|---|---|
| 77373 | 1/1962 | France | 376/329 |
| 866305 | 4/1961 | United Kingdom | 376/328 |
| 866644 | 4/1961 | United Kingdom | 376/328 |
| 1056950 | 2/1967 | United Kingdom | 376/339 |

Primary Examiner—Harvey E. Behrend
Attorney, Agent, or Firm—Karl F. Ross; Herbert Dubno

[57] ABSTRACT

A method of operating a gas-cooled nuclear reactor having graphite fuel elements in which, to reduce the reactor, a quenching element is introduced which takes a particle of a reaction-reducing substance in a sheath which will melt or release the substance in vapor form so that the substance can penetrate in gaseous form through the surrounding graphite body and deposit upon fuel elements.

9 Claims, 3 Drawing Figures

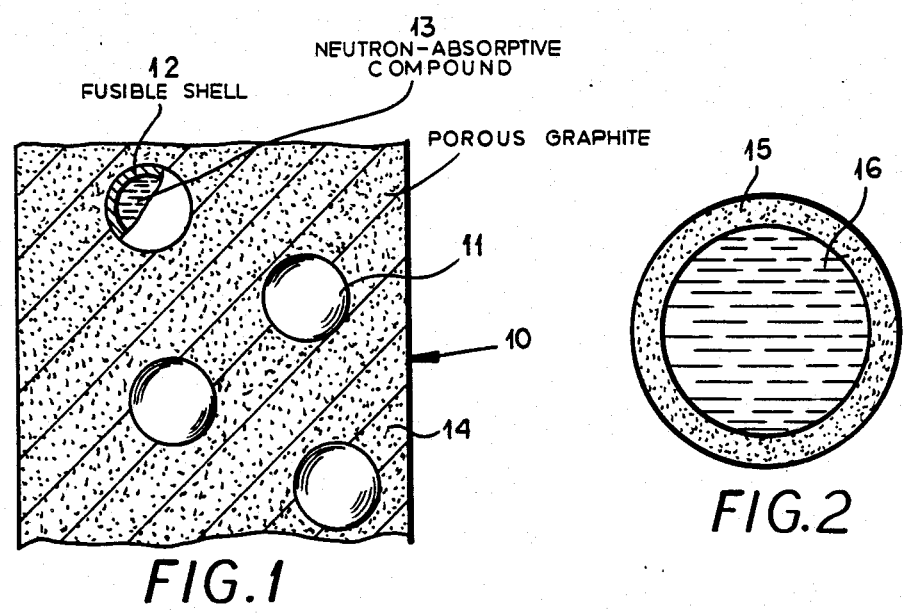
FIG.1
FIG.2
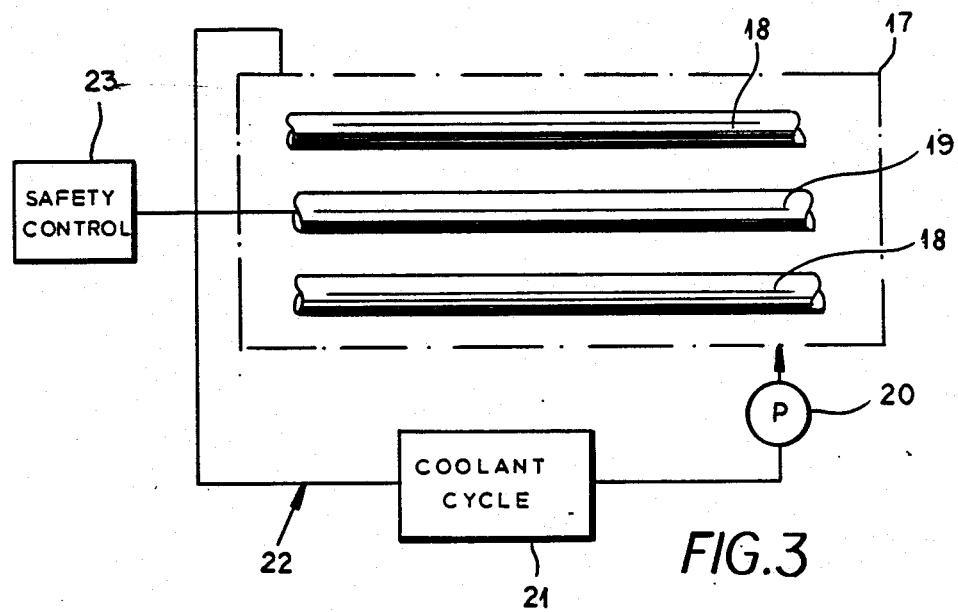
FIG.3

METHOD OF AND DEVICE FOR THE REDUCTION OF REACTIVITY OF A NUCLEAR REACTOR CORE

CROSS REFERENCE TO RELATED APPLICATION

This application is related to the commonly assigned copending application Ser. No. 657,332 filed Oct. 3, 1984, based upon our German application P No. 33 35 888.5 filed Oct. 3, 1983.

FIELD OF THE INVENTION

Our present invention relates to a method of reducing the reactivity of a nuclear reactor core, even to the point of shutdown of the reactor and to a device for this purpose. More particularly, the invention relates to the reduction of the activity and shutdown of a gas-cooled graphite-moderated nuclear reactor of the type in which a cooling gas passes through a core containing nuclear fuel materials embedded in graphite and in which the fuel elements have a graphite surface.

BACKGROUND OF THE INVENTION

From U.S. Pat. No. 4,239,697 and the corresponding German Open Application DE-OS No. 27 53 928, it is known to reduce the reactivity and shutdown of a nuclear reactor by coating free surfaces of graphitic bodies containing fissionable fuel materials with a neutron-absorbing substance.

Nuclear reactor installations generally comprise a number of control systems for regulating the reactivity of the reactor core and shutting down the chain reaction thereof. It is important that such shutdown systems be of such nature that they allow reactivation of the core in the event an emergency situation has been alleviated.

In the aforementioned U.S. patent and the corresponding German application, there is described a gas-cooled nuclear reactor having graphitic fuel elements and in which the nuclear reaction is quenched by depositing a gadolinium-containing substance on the surfaces of the fuel elements by introducing that substance into the circulating cooling gases of the primary coolant contacting the fuel elements. The more gadolinium which is deposited upon the graphite surfaces of the fuel elements, the greater will be the absorption of thermal neutrons and the greater the reduction in reactivity.

Since gadolinium in its natural isotropic mixture has the greatest neutron absorption cross-section for thermal neutrons of all naturally occurring elements, it suffices to deposit a comparatively small amount of gadolinium upon the fuel element.

If it is desired to restart the reactor, the gadolinium may be desorbed by increasing the temperature of the reactor core and flushing it with gadolinium-free gas, by scrubbing or by a nuclear decomposition. Replacement of the gadolinium-cooled fuel elements by fresh fuel elements can also restore the reactivity.

According to this earlier patent, the gadolinium compounds which are used can be applied as sols or solutions or in a gaseous state. Preferably an aqueous gadolinium acetate is used on the substance if applied as a gadolinium compound in a gaseous form, e.g. as gadolinium aluminum isopropoxide —$Gd(Alc_3H_7O)_4)_3$— or gadolinium tricyclopentadienyl —$Gd(C_5H_5)_3$, the latter sublimating from the solid phase since it has no liquid phase.

In their earlier system the substances were introduced through a bypass to the cooling gas circulation and, naturally, this poses no problem when the cooling gas circulation is intact.

However, since a frequent cause of breakdown and the need for shutdown of the reactor is failure of the primary cooling system, the reliable introduction of the gadolinium compounds could not be ensured. Consequently, it is necessary to provide additional piping for the reactor to enable the introduction of the reactivity-reducing compounds.

OBJECTS OF THE INVENTION

It is the principal object of the present invention to provide an improved method of reducing the reactivity of a nuclear reactor of the type described whereby the need for additional piping is eliminated and which enables the reduction of reactivity to be effected reliably.

Another object of this invention is to provide an improved method of shutting down a nuclear reactor of the gas-cooled graphite moderated type.

Still another object of the invention is to provide an improved device or article for use in the improved method of the invention.

It is also an object of the invention to provide a method for the purposes described which can be utilized even when there has been damage to the primary coolant circulation of a gas-cooled graphite moderated nuclear reactor.

SUMMARY OF THE INVENTION

These objects and others which will become apparent hereinafter are attained, in accordance with the present invention, in a method for reducing the activity and shutting down a gas-cooled graphite moderated nuclear reactor which comprises graphite fuel elements in which the nuclear fuel material is embedded in the graphite and the fuel elements are cooled by direct contact with a primary cooling gas and have a graphitic surface. According to the invention, at least one element is introduced into the reactor core which comprises a graphite body permeable to vapor of a neutron-absorbing substance and the neutron-absorbing substance is incorporated into this body in the form of particles from which the neutron-absorbing substance is released at in a gas form to temperatures above a predetermined temperature so that the gaseous neutron-absorbing material can enter the gas spaces of the reactor core and coat upon the graphitic surfaces of the fuel elements.

To reduce the activity or shutdown the nuclear reactor, therefore, we introduce into the latter elements which are comprised of graphite and contain particles with the neutron absorbing substances. This neutron absorbing substances may hereinafter be referred to also as a shutdown substance or as an activity-reducing substance.

The particles are so constituted that the neutron absorbing substance is released at a predetermined temperature which corresponds to the desired shutdown temperature in the reactor core to release the substance into the latter.

This can be accomplished by providing the particles with a coating which becomes gas-permeable at the predetermined temperature or melts or otherwise is decomposed.

The graphite body containing these particles is permeable to the gas phase of the neutron-absorbing substance and the latter substance. The coating and the graphite of the shutdown element are so related to one another that the shutdown substance which is capable of absorbing thermal neutrons can reach the fuel elements around the shutdown elements when the shutdown temperature is reached.

The shutdown elements can be introduced into the reactor core together with the usual fuel elements. In that case, no further means for activating the shutdown by this mechanism is required since shutdown will ensue only upon attainment of the threshold temperature.

However, we can also introduce the shutdown element into the core utilizing the mechanism for controlling the introduction and removal of fuel elements, as need arises. In the first case the reactor has an inherent shutdown system which is activated when the critical temperature is such so as to liberate the shutdown substance automatically even in the case of complete failure of the primary coolant circulation.

The number of particles and their distribution in the reactor core or the number of particles per shutdown element and the distribution of the latter in the reactor core can be comparatively small because of the high neutron absorption cross section of the substance. Hence neutron losses during normal operation can be held relatively low. This is because the shutdown substance is highly concentrated at sparse localities. Indeed, we have found that a ratio of shutdown elements to fuel elements can be 1:1000 with effective shutdown response.

The static inherent shutdown system described eliminates the need for any active measures in effecting shutdown and the invention also has the advantage that the simple replacement of a comparatively few fuel elements in existing nuclear reactors under construction and reactors in the planning stages be shutdown elements according to the invention and can suffice to provide the requisite security against failure without modification of the reactor or its design.

According to a feature of the invention, the particles have such a size that they are practically self-shielding and thus are subjected to a minimum of decomposition in the neutron flux of the reactor under normal operation. The shutdown elements can have outer dimensions corresponding to those of a fuel element so that direct substitution is possible in the manner described. Furthermore, the particles should contain the neutron absorbing substances in such quantities that, even with decomposition in the neutron flux of the reactor, a sufficient quantity of the substance will remain at the end of the usefulness of the reactor charged to be effective until a few changes occurs. The coating is most advantageously that of a metal from the rare earth group or alloys containing rare earth elements, although coatings of pyrolytic carbons can also be used and the neutron absorbing substance is preferably gadolinium, but also can be samarium or europium, in the form most advantageously of halogen compounds.

The arrangement whereby the quenching elements have particles with neutron-absorbing substances in amounts sufficient to survive the thermal neutron flux for at least the duration of the residence times of the fuel elements with which they are associated, enable the invention to be used with particle effectiveness for a nuclear reactor in which the fuel elements may be graphite balls containing the fissionable fuels and traverse the reactor in a single pass, e.g. when the reactor operates on the so-called OTTO-process.

When the pure rare earth elements are used as coating materials, they can cover the melting point range between 800° C. for samarium to 1650° C. for lutetium, thereby establishing corresponding thresholds for release of the neutron absorption substance.

Consequently, we can make the particles respond to relatively low temperatures as well as relatively high temperatures of potential failure of a particular reactor. Alloys of these metals can also be used and when the coating is constituted of gadolinium, samarium, europium or dysprosium, the coating also acts as a protective coating against nuclear decomposition of the absorbing substances since the coating also acts as a neutron getter or absorber.

The use of pyrolytic carbons has been found to be advantageous because it becomes progressively more porous at temperatures above 1000° C. and thus allows proportioning the reactivity reduction release of the absorbing substance at temperature increase. The higher the temperature in the rector core, therefore, the more of the absorbtion substance will be released and cooled onto the surfaces of the fuel element. As the temperature in the reactor core drops, the pyrolytic carbon coating becomes less permeable until eventually it hermetically seals.

The preferred halides of the gadolinium, samarium or europium or other rare earth absorbing substances are fluoride, bromide and iodide. These halides are stable at high temperatures and pyrolytic decomposition does not occur prematurely or undesirably when the material is introduced into the particles or distributed in the hot reactor core. Another neutron-absorbing substance can be used as long as its vapor pressure and stability allows it to be utilized in the manner which has and will be described although the ones named have been by far found to be the best.

BRIEF DESCRIPTION OF THE DRAWING

The above and other objects, features and advantages of the present invention will become more readily apparent from the following description, reference being made to the accompanying drawing, in which:

FIG. 1 is a diagrammatic cross-section through a quenching element according to the invention;

FIG. 2 is a cross-section through a particle according to another embodiment of the invention; and FIG. 3 is a diagram representing a reactor according to the invention.

SPECIFIC DESCRIPTION

In FIG. 1 we have shown a porous graphite body 14 forming a quenching element 10 which can be introduced into a gas-cooled nuclear reactor and in which particles 11 are embedded. Each particle 11, as is also apparent from this Figure, can comprise a rare earth metal shell 12 melting at the appropriate activation temperature and containing the neutron absorptive compound, e.g. a gadolinium halide as represented at 13.

Such elements have been introduced into a nuclear reactor together with the fuel charge, the elements having the same dimension and shape as the fuel elements.

When the desired threshold temperature is reached, the shells 12 melt and at the high temperatures the gadolinium halide is released to pass through the porous body 14 and coat gadolinium onto the graphite surfaces of the fuel elements.

The particles shown in FIG. 2 comprise a pyrolytic carbon shell 15 enclosing the neutron absorptive halide 16. This shell is characterized by the fact that at about 1000° C., with increasing temperature, the pores increasingly open to allow progressively increasing release of the neutron absorptive material.

FIG. 3 represents a diagram of a core 17 of a gas-cooled nuclear reactor in which the fuel elements have been represented as rods 18 and are disposed in the core together with a rod 19 containing the particles of FIGS. 1 and 2 as described. While the rod 19 can be inserted into the core together with the fuel elements, it may also be introduced by a safety control 23 of the type used to insert a moderator rod.

The more common application of the invention, however, is not a ball element nuclear reactor as described in the aforementioned U.S. patent and will be discussed below. The primary gas circulation is represented by the pump 20 and a secondary cooler 21. It will be apparent that the safety system of the invention is effective even upon failure of the primary coolant system.

SPECIFIC EXAMPLES

In the following specific examples 1-3, we will describe graphite elements of a type which pass through the reactor core of a piled ball reactor together with the fuel elements. The elements contain, as a neutron-absorbing substance, a halogen compound of a rare earth metal, for example a gadolinium, samarium or europium halogen compound, especially fluoride, bromide or iodide, or mixtures thereof. This shutdown substance is coated with or enclosed in (ensheathed in) a metal which has a melting point corresponding to the threshold for release of the reactivity-reducing substance. The latter then in a gaseous form can penetrate the graphite body in which the element or particle is embedded because of the porosity of the graphite and in the ambient space around the body can come into direct contact with the fuel elements to be absorptively deposited thereon.

EXAMPLE 1

The shutdown element as a hollow ball formed of graphite whose size corresponds to the size of the fuel element balls of a stacked ball of a reactor. The absorption substance was gadolinium-III-bromide which was introduced in the form of particles with a particle size of less than 5 mm in the graphite element. The graphite shutdown element was added to a graphite ball filling simulating the fuel element packing of a stacked ball reactor. The filling was heated together with the shutdown element to 850° C. As soon as this temperature was achieved, the absorptive substance was detected at spacings up to 750 mm from the shutdown elements, i.e. it had been dispersed to a volume with a diameter 1.5 mm in the pile so that the gadolinium was detected on the surfaces of the balls of this packing.

EXAMPLE 2

A graphite element is provided with particles of the absorption substance in a sheath of metallic gadolinium. The gadolinium is practically impermeable at temperatures below the melting point. As to the absorption substance, however, the gadolinium sheath melts or fuses at a temperature between 1300° C. and 1350° C. and at this temperature liberates the absoprtion substance which was the gadolinium-III-bromide used in Example 1. The gadolinium-III-bromide upon melting of the metallic gadolinium sheath has a partial pressure of 0.28 bar and is effectively distributed in the fuel element bed of the reactor. It was found that the metallic gadolinium serving as a coating for the neutron absorption substance also serves as a protective shield from neuclitic burn of the enclosed absorption substance. With similar effects, we can use for high temperature shutdown of a nuclear reactor, europium which has a melting point of about 830° C., samarium which has a melting point of 1070° C. and dysprosium which has a melting point of about 1400° C. For a shutdown temperature of about 1500° C., erbium may be used which has a corresponding melting point.

EXAMPLE 3

Naturally the halogen compounds of the rare earths which were employed must have an effective vapor pressure at the melting point at which the protective sheath decomposes. One criterion for the use of selection of these halogen compounds is their melting point, because above the melting point the vapor pressure generally increases very rapidly. This melting point should be close to the usual operating temperature of the nuclear reactor for which the graphite element is employed. For stacked ball reactors the most important shutdown range is a temperature between 900° C. and 1300° C. and the melting point of the following shutdown substances are thus given below so that the worker in the art may make use of the appropriate rare earth halide for the desired shutdown temperature:

| | | |
|---|---|---|
| SmBr$_3$ | melting point | 913° C. |
| EuBr$_3$ | | 975° C. |
| GdBr$_3$ | | 1038° C. |
| GdJ$_3$ | | 1198° C. |
| GdF$_3$ | | 1228° C. |
| EuF$_3$ | | 1276° C. |
| SmF$_3$ | | 1305° C. |

EXAMPLE 4

A graphite element containing a particle of a shutdown substance of the type used in Examples 1-3 has a pyrolytic carbon sheath. The pyrolytic carbon coating, depending upon its quality, is not suddenly gas permeable at a temperature above 1000° C. but generally tends to become permeable with increasing temperature. We are thus able to use this element to progressively reduce the reactivity by progressive release of the shutdown substance with increasing temperature of the reactor core. When the temperature of the reactor core drops below the threshold, as the pyrolytic carbon coating has progressively reduced porosity, eventually the release of the absorption substance is cut off.

EXAMPLE 5

A graphite element contain particles of a diameter of 10 mm, the particles corresponding to those of Examples 1-3. On the pyrolytically coated particle of Example 4 the quenching element is supplied into the reactor core in a ratio to the fuel elements of 1:1000. The reactivity of the reactor core is reliably reduced below 0.1%.

EXAMPLE 6

When such a particle (Example 5) comprises metallic gadolinium and contain gadolinium-III-bromide, after 1000 days in the reactor core substantially 100% of the shutdown substance in the particle remain active. Consequently, practically neuclidic burn-out occurs.

EXAMPLE 7

A fuel element is provided with a particle of a diameter of about 1 mm of the shutdown substance in addition to its nuclear fuel particles. The incorporation of the shutdown particles in fuel elements is advantageous because they eliminate the need for additional shutdown elements. The absorptive substance is protected by self-shielding against neuclidic burn-out. With gadolinium compounds, the self-shielding effect with a sheath of a thickness of 0.01 mm is noticeable and is practically complete in a thickness of the compound of 0.5 mm which is satisfactory where the particle diameter is 1 mm.

The burn-out of the absorptive material can be proportioned to the burn-out of the fuel element in which it is incorporated so that as the fuel element is depleted, the availability of the absorptive material is reduced. Where each fuel element contain a particle of the absorptive substance, we are able to eliminate errors of loading the reactor with the fuel absorption elements. Such fuel elements carry its safety particle from its production process to its reworking or final storage.

Apart from the rear earth halogen compounds of Examples 1-3, we make use of other gadolinium compounds, samarium compounds as long as their vapor pressure and stability suffice for the purposes described.

We claim:

1. In a method of reducing the reactivity of and shutting down a gas-cooled graphite-moderated nuclear reactor having a reactor core containing fuel elements of nuclear fuel embedded in graphite and having graphitic surfaces along which a cooling gas can flow, the improvement which comprises the steps of:
   (a) forming quenching-element particles by enclosing and sealing in a sheath stable at temperatures below a predetermined shutdown temperature for said core, a neutron-absorbing substance which is in a gas phase above said predetermined shutdown temperature, the sealing of said particles by said sheath ceasing upon heating of said particles to a temperature above said predetermined shutdown temperature;
   (b) incorporating a plurality of said particles in a graphite body permeable to said neutron-absorbing substance in said gas phase to form a quenching element, said graphite body having an outer surface permeable to said neutron-absorbing substance in said gas phase; and
   (c) introducing at least one of said graphite bodies into said core of said nuclear reactor so that said body is present during normal operation but, upon an elevation of the temperature of said core above said predetermined shutdown temperature, said substance is liberated from said particles, penetrates through said body in the form of a gas and deposits on free graphite surfaces of said core, said particles each having a size sufficient to render them self-shielding agaist neutron flux in said core.

2. The method defined in claim 1 wherein said body is formed with outer configuration and dimensions corresponding to that of one of said fuel elements of said core.

3. The method defined in claim 1 wherein said particles are introduced into said core in said quenching elements in an amount such that said core contains a mass of said substance sufficient to survive burn-out of said nuclear fuel with a neutron absorption effectiveness diminishing with such burn-out of the fuel.

4. The method defined in claim 1 wherein said sheath is composed of a material selected from the group which consists of pyrolytic carbon, rare earth metals and rare-earth-metal alloys, and said substance is a halogen compound of gadolinium, samarium or europium.

5. In a gas-cooled graphite-moderated nuclear reactor having nuclear fuel elements in a core containing at least one quenching element, the improvement in which said quenching element comprises:
   quenching-element particles each having sealed sheaths stable at temperatures below a predetermined shutdown temperature for said core, and a neutron-absorbing substance sealed in said sheaths and which is in a gas phase above said predetermined shutdown temperature, the sealing of said sheaths ceasing upon heating of said particles to a temperature above said predetermined shutdown temperature; and
   a graphite body permeable to said neutron-absorbing substance in said gas phase and in which a plurality of said particles are incorporated so that said particles are present during normal operation but, upon an elevation of the temperature of said core above said predetermined shutdown temperature, said substance is liberated from said particles, penetrates through said body in the form of a gas and deposits on free graphite surfaces of said core, said particles each having a size sufficient to render them self-shielding against neutron flux in said core, said graphite body having an outer surface permeable to said neutron-absorbing substance in said gas phase.

6. The improvement defined in claim 5 wherein said body has outer configuration and dimensions corresponding to that of one of said fuel elements of said core.

7. The improvement defined in claim 5 wherein said particles are present in said core in said quenching elements in an amount such that said core contains a mass of said substance sufficient to survive burn-out of said nuclear fuel with a neutron absorption effectiveness diminishing with such burn-out of the fuel.

8. The improvement defined in claim 5 wherein said sheath is composed of a material selected from the group which consists of pyrolytic carbon, rare earth metals and rare-earth-metal alloys, and said substance is a halogen compound of gadolinium, samarium or europium.

9. The improvement defined in claim 5 wherein said body contains a fissionable nuclear reactor fuel.

* * * * *